United States Patent
Beatty, III et al.

(10) Patent No.: US 8,943,475 B2
(45) Date of Patent: Jan. 27, 2015

(54) METHODS AND SYSTEMS FOR INTERACTIVE DEBUGGING IN A MIXED COMPUTER ENVIRONMENT

(75) Inventors: Harry J. Beatty, III, Clinton Corners, NY (US); Peter C. Elmendorf, Poughkeepsie, NY (US); Charles Gates, Poughkeepsie, NY (US); Chen Luo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 13/007,744

(22) Filed: Jan. 17, 2011

(65) Prior Publication Data

US 2012/0185828 A1    Jul. 19, 2012

(51) Int. Cl.
G06F 9/44    (2006.01)
G06F 11/36    (2006.01)

(52) U.S. Cl.
CPC .................................. *G06F 11/3664* (2013.01)
USPC ............................ 717/124; 717/162; 717/167

(58) Field of Classification Search
None
See application file for complete search history.

(56) References Cited

U.S. PATENT DOCUMENTS

| 4,414,624 | A | | 11/1983 | Summer, Jr. et al. |
| 5,307,492 | A | | 4/1994 | Benson |
| 5,933,639 | A | * | 8/1999 | Meier et al. .................. 717/129 |
| 6,026,362 | A | * | 2/2000 | Kim et al. ..................... 705/317 |
| 6,158,045 | A | * | 12/2000 | You .............................. 717/124 |
| 6,209,020 | B1 | | 3/2001 | Angle et al. |
| 6,324,683 | B1 | * | 11/2001 | Fuh et al. ...................... 717/124 |
| 6,711,616 | B1 | | 3/2004 | Stamm et al. |
| 6,886,081 | B2 | * | 4/2005 | Harres .......................... 711/152 |
| 6,931,636 | B2 | * | 8/2005 | Deao et al. .................... 717/167 |
| 7,031,887 | B2 | | 4/2006 | Jain et al. |
| 7,555,744 | B2 | * | 6/2009 | Chkodrov et al. ............ 717/124 |
| 7,584,239 | B1 | | 9/2009 | Yan et al. |
| 7,992,133 | B1 | * | 8/2011 | Theroux et al. ............... 717/124 |
| 8,001,427 | B2 | * | 8/2011 | Sohm et al. ..................... 714/45 |
| 8,205,095 | B2 | * | 6/2012 | Chung .......................... 713/187 |
| 2004/0019890 | A1 | | 1/2004 | Verbeke et al. |
| 2004/0054861 | A1 | * | 3/2004 | Harres .......................... 711/163 |
| 2004/0243979 | A1 | * | 12/2004 | Pugh et al. .................... 717/124 |
| 2005/0086644 | A1 | * | 4/2005 | Chkodrov et al. ............ 717/124 |
| 2005/0223359 | A1 | * | 10/2005 | Nagaraju et al. .............. 717/124 |
| 2006/0130065 | A1 | | 6/2006 | Chin et al. |

(Continued)

OTHER PUBLICATIONS

Miller, B., et al., A Mechanism for Efficient Debugging of Parallel Programs, PADD '88 Proceedings of the 1988 ACM Sigplan and Sigops workshop on Parallel and distributed debugging, 1988, pp. 141-150, [retrieved on Sep. 4, 2014], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Cantor Colburn LLP; William Steinberg (57) ABSTRACT

A method of debugging a computer program across a mixed computing environment is provided. The method includes attaching a first debug module to a first program module of the computer program, where the first program module is operating on a first node; attaching a second debug module to a second program module of the computer program, where the second program module operating a second node of a different computer architecture; and initiating debug functions of at least one of the first debug module and the second debug module through a distant linker.

18 Claims, 6 Drawing Sheets

(56) References Cited

U.S. PATENT DOCUMENTS

| | | | | |
|---|---|---|---|---|
| 2006/0225060 A1* | 10/2006 | Goyan | | 717/151 |
| 2007/0006174 A1* | 1/2007 | Sohm et al. | | 717/131 |
| 2007/0055958 A1* | 3/2007 | Birenheide et al. | | 717/124 |
| 2007/0250814 A1* | 10/2007 | Bendapudi et al. | | 717/124 |
| 2008/0209405 A1* | 8/2008 | Roberts et al. | | 717/129 |
| 2009/0119513 A1* | 5/2009 | Chung | | 713/187 |
| 2009/0164995 A1 | 6/2009 | Waris | | |
| 2009/0228892 A1 | 9/2009 | Di Luoffo et al. | | |
| 2012/0185837 A1* | 7/2012 | Beatty et al. | | 717/162 |

OTHER PUBLICATIONS

Meier, M., et al., Experiences with Building Distributed Debuggers, SPDT '96 Proceedings of the Sigmetrics symposium on Parallel and distributed tools, 1996, pp. 70-79, [retrieved on Sep. 4, 2014], Retrieved from the Internet: <URL:http://dl.acm. org/>.*

Anthony Chronopoulous, "A Class of Parallel Iterative Methods Implemented on Multiprocessors", Dept. of Computer Science, University of IL, Nov. 1986.

Khalifa et al., "Dynamic On-Line Allocation of Independent Task onto Heterogeneous Computing Systems to Maximize Load Balancing", 978-1-4244-3555-5/08 IEEE 2008.

Mark Edward Segal et al., "Dynamic Program Updating in a Distributed Computer System", IP.com, IPCOM00128761D, 1989.

U.S. Appl. No. 12/985,887, filed Jan. 6, 2011, Title: Methods and Systems for Delegating Work Objects Across A Mixed Computer Environment, Inventor: Harry J. Beatty III, et al.

* cited by examiner

METHODS AND SYSTEMS FOR INTERACTIVE DEBUGGING IN A MIXED COMPUTER ENVIRONMENT

BACKGROUND

The present invention relates to systems, method and computer program products for delegating work in a computer environment.

Parallel programming is a form of parallelization of computer code across multiple processors in parallel computing environments. Task parallelism distributes execution processes (threads) across different parallel computing nodes. Debugging the execution of a parallel program can be tedious and error prone.

SUMMARY

According to one embodiment, a method of debugging a computer program across a mixed computing environment is provided. The method includes attaching a first debug module to a first program module of the computer program, where the first program module is operating on a first node; attaching a second debug module to a second program module of the computer program, where the second program module operating a second node of a different computer architecture; and initiating debug functions of at least one of the first debug module and the second debug module through a distant linker.

According to another embodiment, a computer program product for debugging a computer program across a mixed computing environment is provided. The computer program product includes one or more tangible storage mediums readable by a processing circuit and storing instructions for execution by the processing circuit for performing a method. The method includes: attaching a first debug module to a first program module of the computer program, where the first program module is operating on a first node; attaching a second debug module to a second program module of the computer program, where the second program module operating a second node of a different computer architecture; and initiating debug functions of at least one of the first debug module and the second debug module through a distant linker.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
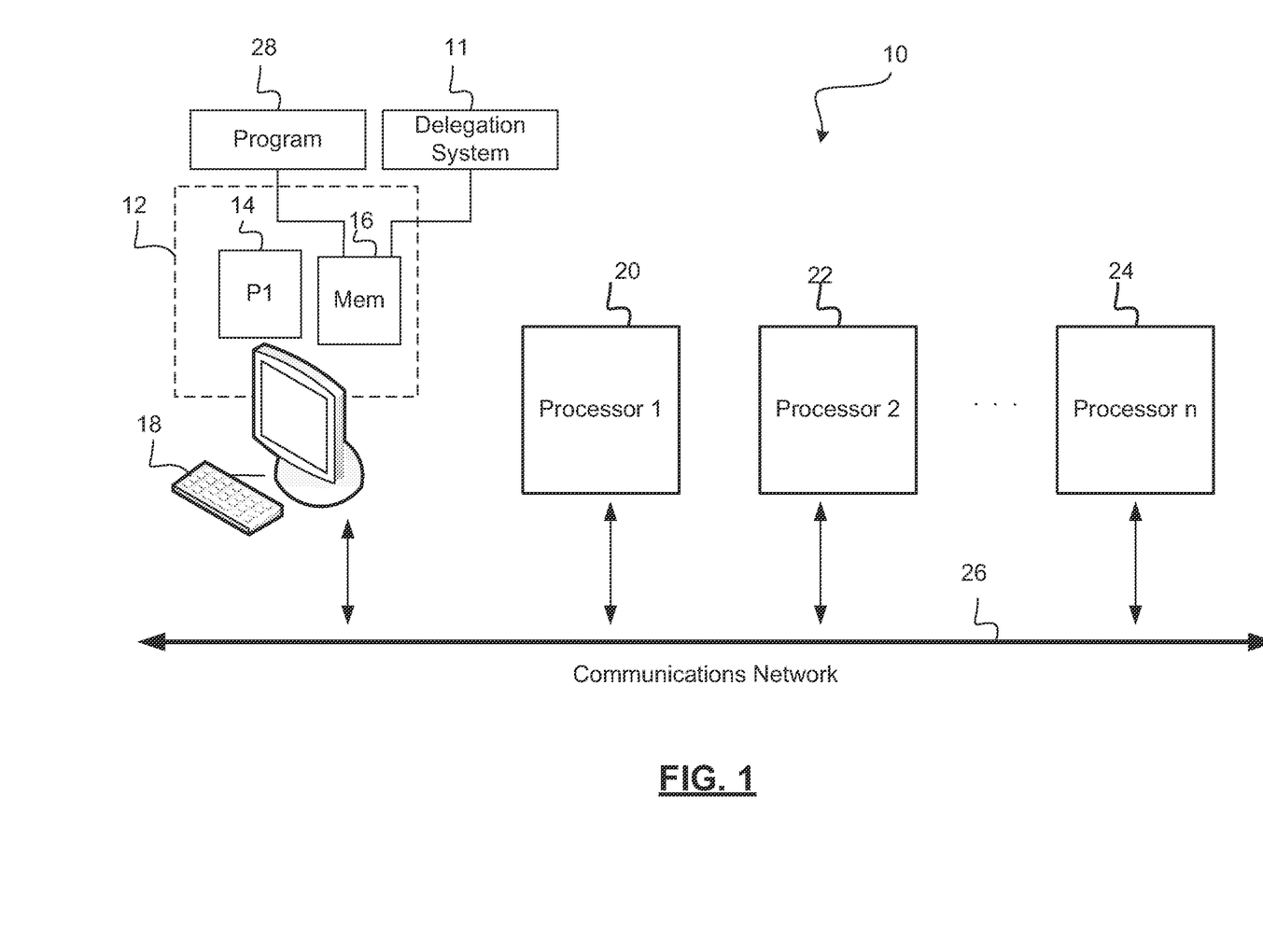
FIG. 1 is a block diagram illustrating a computing system that includes a debug system in accordance with exemplary embodiments.

With reference now to FIG. 1, a computer system is shown generally at 10 that includes a debug system 11 in accordance with various embodiments. The computer system 10 includes a first machine 12 that includes a first processor 14 that communicates with computer components such as memory devices 16 and peripheral devices 18. The computer system 10 further includes one or more other processors 20-24 that can similarly communicate with computer components 16, 18 and with the other processors 14, 20-24. In various embodiments, the one or more other processors 20-24 can be physically located in the same machine 12 as the first processor 14 or can be located in one or more other machines (not shown).

Each of the processors 14, 20-24 communicates over a network 26. The network 26 can be a single network or multiple networks and can be internal, external, or a combination of internal and external to the machine 12, depending on the location of the processors 14, 20-24.

In various embodiments, each processor 14, 20-24 can include of one or more central processors (not shown). Each of these central processors can include one or more sub-processors. The configuration of these central processors can vary. Some may be a collection of stand alone processors attached to memory and other devices. Other configurations may include one or more processors that control the activities of many other processors. Some processors may communicate through dedicated networks or memory where the controlling processor(s) gather the necessary information from disk and other more global networks to feed the smaller internal processors.

In the examples provided hereinafter, the computing machines 12 and processors 14, 20-24 will commonly be referred to as nodes. The nodes perform portions of a computer program 28. The debug system 11 interacts with the computer program 28 during execution to provide debug information to a programmer.

Figure 2:
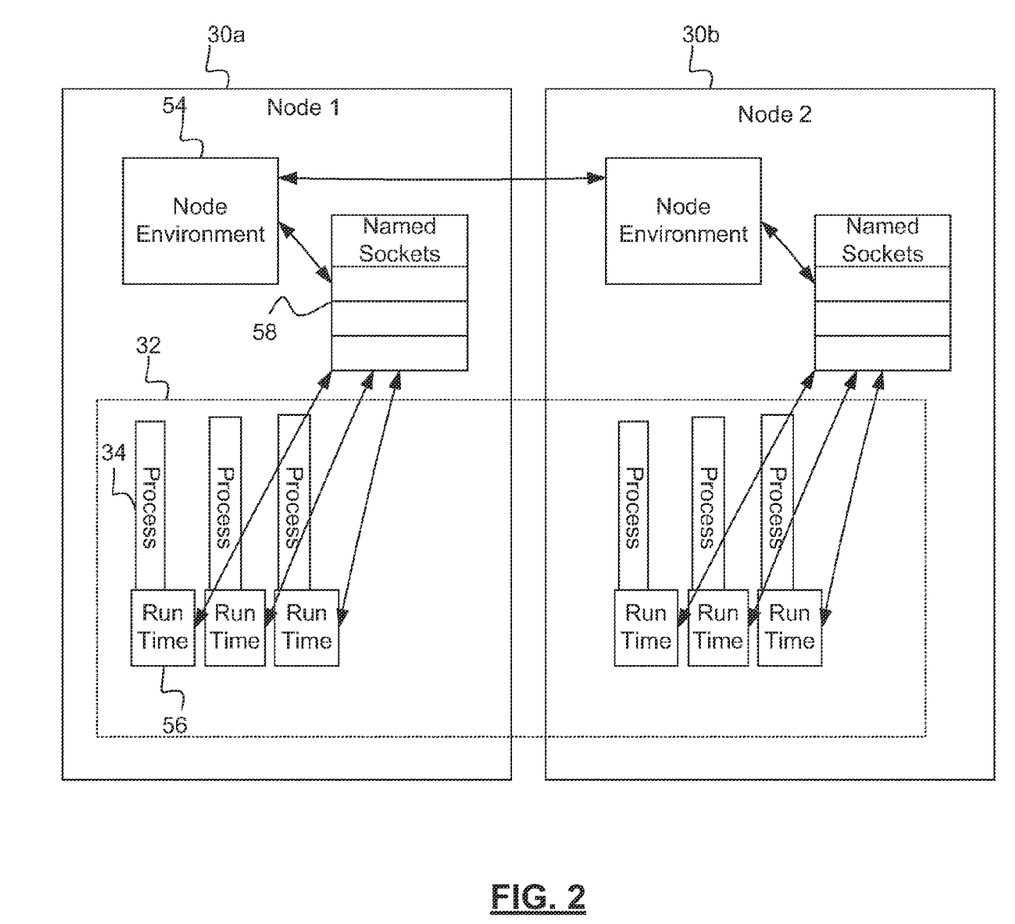
FIGS. 2 and 3 are block diagrams illustrating the computing system of FIG. 1 in more detail in accordance with exemplary embodiments.
Figure 3:
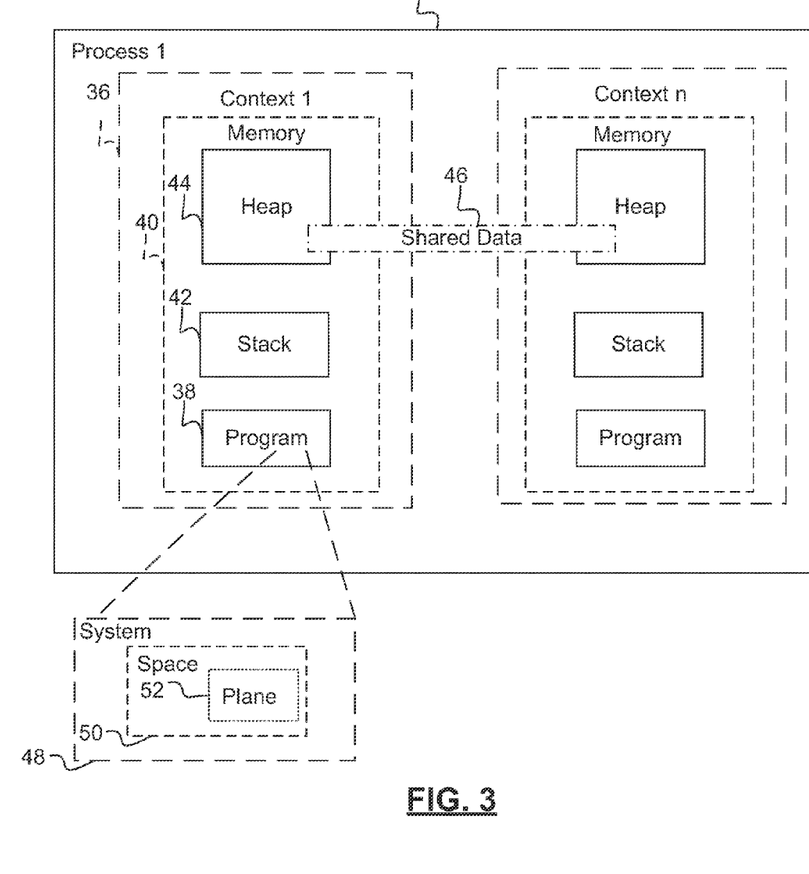

With reference now to FIGS. 2 and 3, the examples herein will be discussed in the context of two nodes 30a and 30b. As can be appreciated, the debug system 11 of the present disclosure is applicable to any number nodes and is not limited to the present examples. As discussed above, the nodes 30a and 30b are implemented according to different architectures. The nodes perform portions of the computer program 28. A single instantiation of a computer program 28 is referred to as a universe 32. The universe 32 is made up of processes 34.

As shown in FIG. 3, each process 34 operates as a hierarchy of nested contexts 36. Each context 36 is program logic 38 of the computer program 28 (FIG. 1) that operates on a separate memory image. Each context 36 can be associated with private memory 40, a stack 42, and a heap 44. The context 36 may have shared data 46 for global variables and program logic 58.

The program logic 38 of each context 36 can be composed of systems 48, spaces 50, and planes 52. For example, the universe 32 (FIG. 2) is the root of the hierarchy and within the universe 32 (FIG. 2) there can be one or more systems 48. The system 48 can be a process 34 that includes one or more spaces 50 and/or planes 52. A space 50 is a separate and distinct stream of executable instructions. A space 50 can include one or more planes 52. Each plane 52 within a space 50 uses the same executable instruction stream, each in a separate thread. For ease of the discussion, the program logic of each context 36 is commonly referred to as a module regardless of the system, space, and plane relationship.

With reference back to FIG. 2, to enable the execution of the universe 32 across the nodes 30*a*, 30*b*, each node 30*a*, 30*b* includes a node environment 54. The node environment 54, handles the linking and operational communications being passed between the nodes 30*a*, 30*b*. In various embodiments, the node environment 54 communicates with other node environments using for example, network sockets (not shown).

To further enable the execution of the universe 32 across the nodes 30*a*, 30*b*, and within the nodes 30*a*, 30*b*, each process 34 may include or be associated with a collection of support routines called a run-time environment 56. In various embodiments, the node environment 54 communicates with the run-time environment 56 using name sockets 58. As can be appreciated, other forms of communication means may be used to communicate between systems such as, for example, shared memory.

Figure 4:
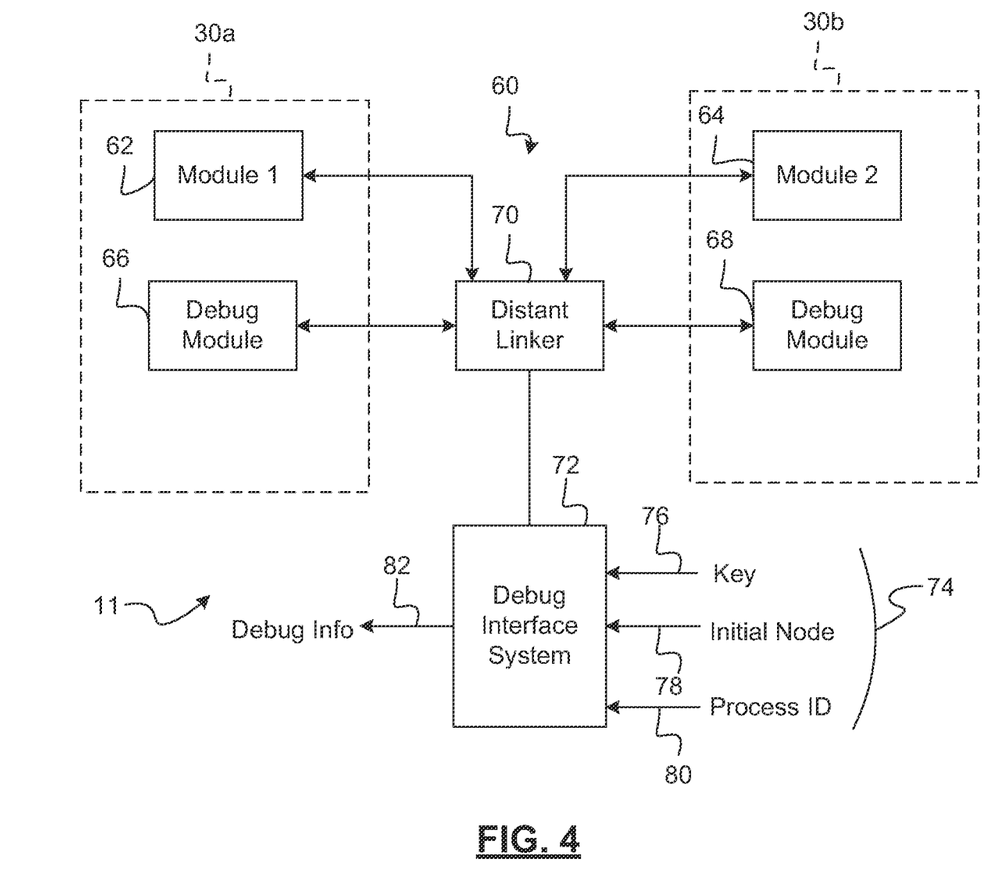
FIGS. 4 and 5 are block diagrams illustrating the debug system in accordance with exemplary embodiments.

With reference now to FIG. 4, the run-time environment 56 and the debug system 11 will be discussed in accordance with exemplary embodiments. The run-time environment 56 can include a linking system 60. The linking system 60 manages the loading and linking of modules of a same process, modules of different processes on a node, modules of different processes on different nodes, and modules of different nodes with different architectures, where, as discussed above, a module is a collection of program logic or executable instructions of the computer program 28 (FIG. 1). In general, the linking system 60 manages the linking by communicating the architectural differences and address differences between the modules. The linking system can be implemented, for example, as discussed in U.S. patent application entitled, "METHODS AND SYSTEMS FOR LINKING OBJECTS ACROSS A MIXED COMPUTER ENVIRONMENT" filed contemporaneously herewith, which is incorporated herein by reference in its entirety.

Generally speaking, the debug system 11 communicates with the linking system 60 to perform debug operations on the computer program 28. In various embodiments, the debug system 11 operates as a separate linked program that attaches itself to program modules under investigation using the run-time environment 56 (FIG. 2).

As shown in the exemplary embodiments of FIG. 4, the program under investigation can include a collection or one or more modules or systems to be investigated. For example, a first module 62 of the first node 30*a* is distantly linked with a second module 64 of the second node 30*b*. Similarly, a first debug module 66 that is associated with the first module 62 is distantly linked with a second debug module 68 that is associated with the second module 64

In various embodiments, the distant linking is performed at the system level. This ensures that the program under investigation is in a different process thus, allowing the system level modules to be loaded and unloaded as needed. System level modules are immune to termination if the system level module under investigation experiences a problem that causes the operating system to terminate that process. Although FIG. 4 illustrates two modules 62, 64, the debug system 11 of the present disclosure is applicable to any number of modules and is not limited to the present example.

A distant linker 70 of the linking system 60 communicates information between the first module 62 and the second module 64. For example, the distantly linked modules communicate with each other through the distant linker 70 using exterior and disclose functions.

The distant linker 70 further communicates with a debug interface system 72. The debug interface system 72 receives information 74 (e.g., a key 76, an initial node 78, a process id 80, etc.) from a programmer to initiate the debug process as well as provides program execution information 82 to the programmer during the debug process. The debug interface system 72 utilizes distant debug commands to communicate with the modules under investigation by sending the debug commands through the distant linker 70. The debug commands can include, but are not limited to, queries that allow the debug system 11 to determine the modules currently loaded, where the modules are running, what architectures are involved, the status of delegation queues, what is locked, what is deadlocked, which nodes can be debugged, and other queries.

Figure 5:
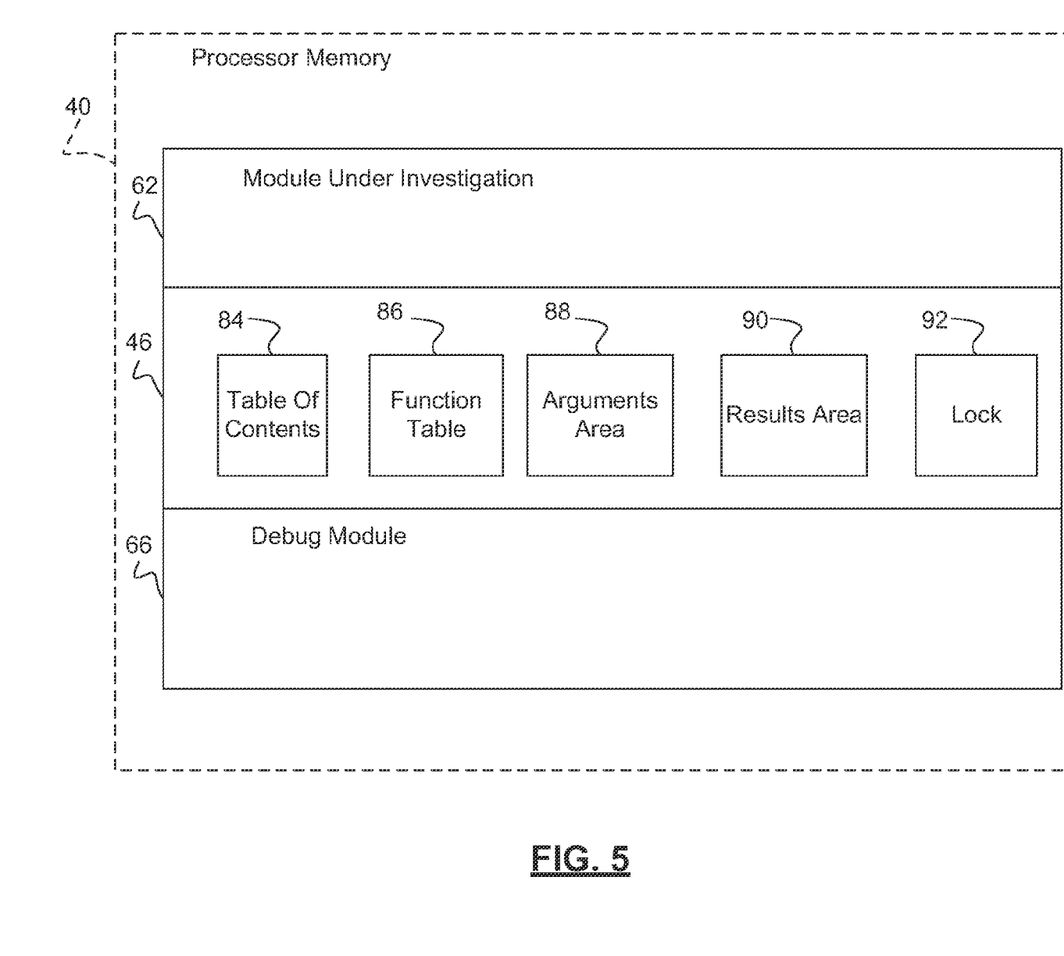

The debug modules 66, 68 receive the commands from the distant linker 70 and perform certain functions based thereon. For example, as shown in FIG. 5, the debug module 66 will be described in accordance with various embodiments. The debug module 66 can attach itself to the first module 62 according to at least two methods. First, based on the commands from the distant linker 70, the debug module 66 uses standard debugging techniques to control the basic flow of the first module 62 for example, by stopping, starting, and stepping through the program logic.

Second, the debug module 66 uses functions calls of the run-time environment 56 to monitor information from the program execution. These function calls are transmitted through the shared memory space 46 between the first module 62 and the debug module 66. This can be accomplished by, for example, an exchange of function names and indexes using the shared memory 46. The shared memory 46 can include, but is not limited to, a table of contents 84, a function table 86, an arguments area 88, a results area 90, and a lock 92.

The table of contents 84 includes entries that indicate offsets to the function table 86, the arguments area 88, the results area 90, and the lock 92. This table of contents 84 starts at the beginning of the shared memory 46, so that each module 62 can find a starting reference. All other references to objects in this shared memory 46 are offsets from the start of the shared memory 46. The debug module 66 triggers the function call through a common locking system. Each module under investigation 62 starts an additional thread to monitor the debug module's common lock 92.

To perform these exchanged functions, the debug module 66 places arguments to a function in the location in shared memory 46 identified as the arguments area 88 along with an index of a function to be executed, releases the module under investigation's lock and locks its own lock via lock 92. Once the module under investigation's lock is released by the debug module 66, the module under investigation 62 examines the shared memory 46 and calls the indexed function passing it the arguments that were in shared memory 46. Once the function completes, the results are placed in the results area 90 of shared memory 46 and the module under investigation 62 releases the debug module's lock and locks its own lock via the lock 92. Once the debug system module's lock is released, the debug module 66 knows the function completed and examines the results area 90 of the shared memory 46.

By doing this, the module under investigation 62 does not have to change its base behavior to work with the debug commands. This approach also does not require that the debug module 66 to perform delegations between the module under investigation 62 and itself. The debug module 66 uses delegations between its systems as would a normal distantly linked program would. The attached debug module 66 performs the attachment to all debug enabled systems under investigation. The distant linker enables and cooperates with the attached debug module 66 to insure all the debug enabled distant modules have a debug system module attached to them.

Functions that may be requested (via the indexing system) by the debug module 66 can, for example, control the behavior of delegation queues on the module 62 under investigation. For example, each context within a system can include a queue that can be conceptually viewed as a queue of in-order work and a queue of out-of-order work (however, in implementation, it may be a single queue where the in-order and out-of-order delegation units are on the same queue but the out-of order delegations can be accessed quickly without having to traverse the in-order-delegation queue to reach the next out-of-order delegation if one exists). Objects are placed on the queue and removed from the queue for processing. The operation of placing an object on the queue and removing the object from the queue is protected by a lock. The debug module 62 through the use of the exchanged function calls can lock and unlock the queue. Once the queue is locked, the context can no longer remove or add additional delegation items. While the queue is locked the debug module 62 can examine and alter the queue. For example, the functions for altering the queue can include, but are not limited to, block the delegation queue, unblock the delegation queue, block the in-order delegation queue, unblock the in-order delegation queue, get work units on queue, move forward a work unit (in-order or our out-of-order), and move backward a work unit (in-order or out-of-order).

The block the delegation queue function prevents delegation work units from being removed from the queue and being processed. This block applies to both the in-order-delegation and out-of-order delegation queues. The unblock the delegation queue function returns both the in-order-delegation and the out-of-order delegation queues to normal operation. The block the in-order delegation queue function prevents in-order delegation work units from being removed from the queue and from being processed but does allow the out-of-order delegation work units to be processed as if the in-order-delegation work units were resource constrained. The unblock the in-order-delegation queue function returns the in-order-delegation queue to normal operation. The get the list of work units function returns the list of work units on the in-order delegation queue. The get the list of work units function can likewise return the list of work units on the out-of-order delegation queue.

The move forward an in-order-delegation work unit function moves the specified in-order-delegation work units ahead in the queue, simulating an earlier arrival time. This forward movement is performed when the preceding in-order-delegation work unit in the queue is not from the same context. The move backward an in-order-delegation work unit function moves the specified in-order-delegation work unit behind in the queue simulating a later arrival time. This backward movement is performed when the following in-order-delegation work unit in the queue is not from the same context.

The move forward an out-order-delegation work unit function moves the specified out-order-delegation work unit ahead in the queue simulating an earlier arrival time. This forward movement is only allowed when the preceding out-order-delegation work unit in the queue is not from the same context. The move backward an out-order-delegation work unit function moves the specified out-order-delegation work unit behind in the queue simulating a later arrival time. This backward movement is only allowed when the following in-order-delegation work unit in the queue is not from the same context.

These functions are targeted at controlling or changing the order with which the delegations are processed on a target context. One difficult task of any debug system 11 is to attempt to recreate a race condition. A race condition is a situation where the program fails because of the order operations were performed by two or more contexts. These functions also address the ability to repeat or create the order a set of delegations were executed by a single context.

The debug module 62 can further create and present to the programmer via the debug information 82 an ancestry tree associated with any of the delegations within a context. To accomplish this, the modules under investigation track the originator of each delegation. For example, they may be required to track this information to know where the results are to be returned. To facilitate the ordering each context places a unique identifier with each delegation. The identifier can be as simple as a counter which is incremented by the context each time it performs a delegation. These counters are context specific so it is possible for two different contexts to have the same count. This is not a problem because it is the combination of the context the count and, the context identification of the context that did the delegation that make it unique.

The context identification determines where the delegation's results are returned. This information allows the debug system 11 to present to the programmer the active delegation sequence order. To associate which delegation spawned others in the system, each delegation also includes the delegation count of its parent.

When a context begins working on a delegation, it stores in a location the context identification it was given by the delegating context. It also stores the context that initiated the delegation along with where to return the results.

When a context performs a delegation to another context it allocates an area of memory for the results to be stored and assigns the delegation the next identification number. Stored in the results area are a reference count and a lock. The reference count indicates how many program references exist for the results area. When the delegation occurs there are two: one for the delegating context, and one for the context doing the delegation. The lock is a structure that will only allow one context to have access to the results area at a time. In the lock structure is a pointer to where the context identification for the delegating context. To perform the delegation ancestry, the debug module 62 first blocks any delegation activity on the context of interest. When examining the active contexts it locates where the results are to be placed when each delegation completes. It then in turn blocks any delegation activity on those contexts that have pending results for the context under investigation. The debug module 62 examines each return block checking the reference count. If the reference count is two or greater then the delegating delegation is still active. If the delegation is active then the debug module 62 examines that delegation's identification and the cycle repeats.

When the debug module 62 examines the results area and determines the reference count is one, the delegating context no longer holds a reference to the results area and therefore is no longer interested in the results. This is not a guarantee that the delegating delegation has finished. It could be alive but no longer holding a reference. In either case, this will break the ancestor reporting chain because the results are no longer relevant with respect to this level of ancestry and higher.

Delegations can be in the active state, pending state, waiting state, or in the ready state. The pending state includes delegations that are on the delegation queue. These delegations have had no work performed on them yet. The active state includes delegations that are actively being executed. The waiting state includes delegations that have been in the active state and that have become blocked by resource contention. The ready state includes delegations that have been in the waiting state and the resource contention no longer exists. These delegations will execute when the active delegation completes or enters the waiting state and there are no other delegations in the ready state preceding this delegation. The debug module 66 can query the module under investigation 62 for the delegations being performed and their status including their delegation count, the parent's context and the parent's count. From the parent count the debug module 66 can associate a specific delegation on a context's delegation queue with a delegation on the parent.

In various embodiments, the functions that implement the debug queries to determine delegations being worked can use the same function mechanism as the debug delegation manipulation calls. The function calls can include, but are not limited to, get the active delegation, get the list of waiting delegations, and get the list of ready delegations Each of these interface functions is targeted to a specific context. A broadcast option can be provided that allows a single command to be targeted to multiple contexts. This can be accomplished by transmitting the same request to all participating debug modules which intern makes the requested call and return the results to the debug interface system that is displaying the information to the user.

Combining the ability to display the delegation queue and get the list of active, waiting, and ready delegations from all the contexts within the distant linked program provides the programmer the ability to monitor and control the flow of delegations in the system.

The debug system 11 can further display errors in the queue ordering. Further it can prevent the programmer from making modifications to the delegation queue that are not possible. For example the debug system 11 highlights situations where a delegation with a higher delegation count is placed before another context from the same delegating context with a lower delegation count. The debug system 11 can also prevent the programmer from moving a delegation on the queue that would have violated these same conditions.

To allow the displaying of source information additional interface functions are provided for getting the modules loaded and what source files are associated with the modules under test. The run-time has the responsibility of tracking all source files including header files. This is required information to allow the person doing the testing to see what actions are taking place in the program and relating them to the source code. A special run-time function that is linked by the distant linker for this purpose is, for example, get the list of modules for a context.

Figure 6:
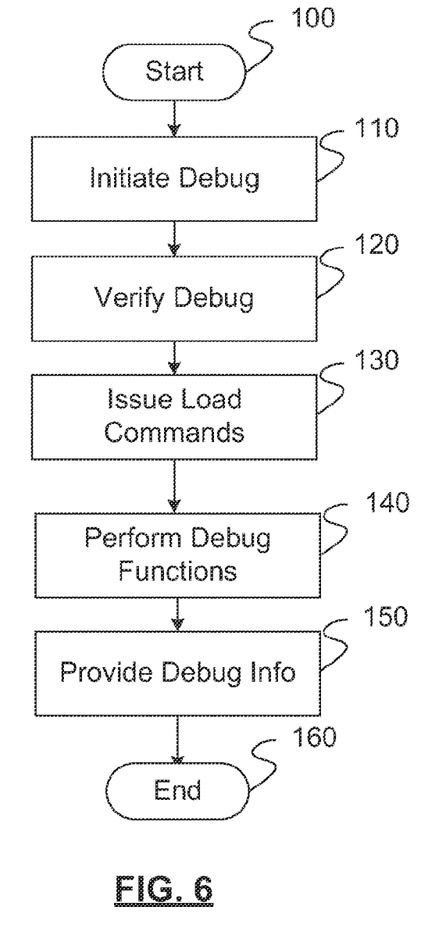
FIG. 6 is a flowchart illustrating a debug method in accordance with exemplary embodiments.

With reference now to FIG. 6 and with continued reference to FIG. 4, where a method of debugging a computer program on a mixed computer environment is shown in accordance with exemplary embodiments. As can be appreciated in light of the disclosure, the order of operation within the method is not limited to the sequential execution as illustrated in FIG. 6, but may be performed in one or more varying orders as applicable and in accordance with the present disclosure.

The method may begin at 100. In various embodiments, the programmer initiates debugging through the debug interface system 72 at 110. The programmer may initiate the debugging by entering the key 76, the initial node 78 that the computer program 28 (FIG. 1) was started on, and the process id 80 of the computer program 28 (FIG. 1). The key 76 can be established for security purposes when the program under investigation is compiled. The key 76 is then used by all modules interacting with the program under investigation including other modules loaded by the program and the debug system 11

Once the debug interface system 72 is initiated, the debug interface system 72 establishes contact with the distant linker 70 for the program under investigation. Debug commands are used to verify the debug interface system's authority to perform the action at 120. For example, the distant linker 70 recognizes the process identification of the initial distantly linked module loaded and the node that contains the initial distantly linked module, and verifies the key that the program under investigation was compiled with.

Once the verification is complete, the distant linker 70 issues load system commands to those systems within the operating program at 130. If a module or system has not been compiled with debugging enabled, the debug system 11 (FIG. 1) will have limited capabilities. For those systems where no debug system modules are available or the system was not compiled with debug enabled, no analysis of that system can be performed. If only some of the modules were compiled with debug enabled, those enabled modules are able to be investigated. Further the analysis of the distant delegation queue will be enabled as well. Since the distant linker 70 knows all the systems linked together it will enable debugging on all the systems including children of those systems that were not compiled with debugging enabled.

Thereafter, the various debug functions are performed at 140 and debug information 82 is presented to the user at 150. Thereafter, the method may end at 160.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of debugging a computer program across a plurality of nodes of a mixed computing environment, comprising:
    attaching, by a debug system through a distant linker, a first debug module to a first program module of the computer program, the first program module operating on a first node of the plurality of nodes, the first node including a first computer architecture;
    attaching, by the debug system through the distant linker, a second debug module to a second program module of the computer program, the second program module operating on a second node of the plurality of nodes, the second node including a second computer architecture that is different from the first computer architecture;
    utilizing, by the debug system through the distant linker, a delegation queue to process a plurality of debug operations on at least one of the first debug module and the second debug module, the delegation queue including at least one of an in-order work queue and an out-of-order work queue, the distant linker being separate from the debug system and connecting the debug system, the first debug module, and the second debug module; and
    processing, by the debug system, the plurality of debug operations in accordance with an order as changed by at least one of the first debug module and the second debug module.

2. The method of claim 1, wherein the processing of the plurality of debug operations is further in response to the debug system receiving information including at least one of a key, an initial node of operation, and a process identification.

3. The method of claim 2, wherein verifying the key in response to the debug system receiving the key as the information, and wherein the processing of the plurality of debug operations is in response to the verifying of the key.

4. The method of claim 1, the plurality of debug operations including:
    analyzing the delegation queue of at least one of the first debug module and the second debug module.

5. The method of claim 1, the plurality of debug operations including:
    modifying content of the delegation queue of at least one of the first debug module and the second debug module.

6. The method of claim 1, the plurality of debug operations including:
    at least one of the debug operations changes an order in which a plurality of delegations are processed by the first debug module.

7. The method of claim 1, the plurality of debug operations including:
    at least one of blocking and unblocking the delegation queue of at least one of the first debug module and the second debug module.

8. The method of claim 1, the plurality of debug operations including:
    at least one of obtaining and moving work units on the delegation queue of at least one of the first debug module and the second debug module.

9. The method of claim 1, wherein the at least one of the in-order work queue and the out-of-order work queue being utilized by the debug system to initiate the plurality of debug operations.

10. A computer program product, the computer program product comprising a non-transitory computer readable storage medium having program instructions of a debug system embodied therewith, the program instructions executable by a processor to cause:
    attaching, by the debug system through a distant linker, a first debug module to a first program module of the computer program, the first program module operating on a first node of the plurality of nodes, the first node including a first computer architecture;
    attaching, by the debug system through the distant linker, a second debug module to a second program module of the computer program, the second program module operating on a second node of the plurality of nodes, the second node including a second computer architecture that is different from the first computer architecture;
    utilizing, by the debug system through the distant linker, a delegation queue to process a plurality of debug operations on at least one of the first debug module and the second debug module, the delegation queue including at least one of an in-order work queue and an out-of-order work queue, the distant linker being separate from the debug system and connecting the debug system, the first debug module, and the second debug module; and
    processing, by the debug system, the plurality of debug operations in accordance with an order as changed by at least one of the first debug module and the second debug module.

11. The computer program product of 10, wherein the processing of the plurality of debug operations is further in response to the debug system receiving information including at least one of a key, an initial node of operation, and a process identification.

12. The computer program product of 11, wherein verifying the key in response to the debug system receiving the key as the information, and wherein the processing of the plurality of debug operations is in response to the verifying of the key.

13. The computer program product of 10, the plurality of debug operations including:
    analyzing the delegation queue of at least one of the first debug module and the second debug module.

14. The computer program product of 10, the plurality of debug operations including:
    modifying content of the delegation queue of at least one of the first debug module and the second debug module.

15. The computer program product of 10, the plurality of debug operations including:
    at least one of the debug operations changes an order in which a plurality of delegations are processed by the first debug module.

16. The computer program product of 10, the plurality of debug operations including:
    at least one of blocking and unblocking the delegation queue of at least one of the first debug module and the second debug module.

17. The computer program product of 10, the plurality of debug operations including:
    at least one of obtaining and moving work units on the delegation queue of at least one of the first debug module and the second debug module.

18. The computer program product of 10, wherein the at least one of the in-order work queue and the out-of-order work queue being utilized by the debug system to initiate the plurality of debug operations.

\* \* \* \* \*